United States Patent
Okumura et al.

(10) Patent No.: US 6,674,701 B2
(45) Date of Patent: Jan. 6, 2004

(54) APPARATUS FOR READOUT OF OPTICAL RECORDING MEDIUM

(75) Inventors: Tetsuya Okumura, Neyagawa (JP); Shigemi Maeda, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 216 days.

(21) Appl. No.: 10/033,319

(22) Filed: Dec. 27, 2001

(65) Prior Publication Data
US 2002/0089908 A1 Jul. 11, 2002

(51) Int. Cl.[7] .................................................. G11B 7/00
(52) U.S. Cl. ....................... 369/47.5; 369/59.1; 369/116
(58) Field of Search ............................ 369/47.1, 47.49, 369/47.36, 47.5, 47.53, 53.1, 53.11, 59.1, 59.11, 116

(56) References Cited

U.S. PATENT DOCUMENTS 5,617,400 A    4/1997 Fuji ........................... 369/116
5,848,045 A  * 12/1998 Kirino et al. ............ 369/47.53
6,459,669 B1 * 10/2002 Fujita et al. ............... 369/59.1

FOREIGN PATENT DOCUMENTS

JP           8-63817         3/1996
JP          2000-99945       4/2000

* cited by examiner

Primary Examiner—Muhammad Edun
(74) Attorney, Agent, or Firm—Edwards & Angell; David G. Conlin

(57) ABSTRACT

By adding a predetermined offset value which is not less than 0 to, to the value of a readout power at a time when readout power control operations are temporarily suspended, i.e., at a time when an optical head initiates a seek operation, with an adder, this latter value being stored in a readout power value storage circuit, because an optical recording medium readout apparatus makes it possible to cause the value of the readout power at the time when readout power control operations resume, i.e., at the time of completion of the seek operation performed by the optical head, to avoid abnormal power domains in which change in amplitude ratio with respect to change in readout power is not monotonically decreasing, it is made possible to avoid abnormal conditions such as occurrence of lag in response during readout power control operations.

7 Claims, 13 Drawing Sheets

APPARATUS FOR READOUT OF OPTICAL RECORDING MEDIUM

BACKGROUND OF THE INVENTION

1. Field of the Invention

The present invention relates to an optical recording medium readout apparatus in which read beam power is controlled based on the amplitude ratio of a readout signal from a magnetic super resolution optical recording medium.

2. Description of the Related Art

Magnetic super resolution magneto-optical readout art has been developed that in magneto-optical disks representing optical recording media provided with a readout layer possessing in-plane magnetization and a recording layer, readout of recorded marks smaller in diameter than the spot size of a beam of light is permitted by as a result of irradiation with a beam of light directed from a readout layer of an magneto-optical disk, causing transfer of magnetic state at the recording layer in correspondence to magnetic state at the readout layer, with transition from in-plane magnetization to perpendicular magnetization, in a portion (hereinafter "aperture") of the irradiated region at which the temperature rises above a predetermined temperature.

In such art, due to changes in ambient temperature during readout it is possible for the optimum readout power of the beam to fluctuate despite the fact that the drive current causing generation of the beam is held constant. Furthermore, when readout power is too high, this causes aperture size to become too large, increasing the presence of crosstalk from adjacent tracks in the output readout signal, decreasing the signal-to-noise ratio of the data being read, and increasing the frequency of occurrence of read errors. Moreover, when readout power is too low, this can cause aperture size to become smaller than the size of recorded marks, and can cause the output of the readout signal from the track being read to become too weak, increasing the frequency of occurrence of read errors.

As a remedy to the foregoing problem, in the conventional art as disclosed at Japanese Unexamined Patent Publication JP-A 8-63817 (1996), two species of readout power control marks having different lengths are provided on a magneto-optical disk, readout power being constantly maintained at an optimum value and frequency of occurrence of read errors being held to an acceptable level as a result of reading these marks and controlling readout power so as to cause the ratio between amplitudes of the signals read from those marks to approach a predetermined value.

Furthermore, in the conventional art as disclosed at Japanese Unexamined Patent Publication JP-A 2000-99945 (2000), in the event that normal detection of amplitude ratio from the signals read from the foregoing readout power control marks is for some reason interrupted, by holding readout power at the value it had immediately preceding occurrence of the inability to carry out normal detection it is possible to prevent abnormality in the controlled readout power.

FIG. 11 is a block diagram showing the constitution of an optical recording medium readout apparatus 1 in the conventional art. FIG. 12 is a drawing showing the structure of a magneto-optical disk 10 representing an optical recording medium. A first sector 15 at a track on an information recording surface of the magneto-optical disk 10 comprises an address region 15a indicating the location of the sector, a readout power control region 15b in which a repeating pattern of short and long marks representing readout power control marks is recorded, and a data recording region 15c in which digital data is recorded. At a track on an information recording surface of the magneto-optical disk 10 other than the track containing the first sector 15, there is a second sector 16, and the second sector 16 comprises regions similar to those of the first sector 15.

The optical recording medium readout apparatus 1 comprises an optical head 2, an amplitude ratio detection circuit 3, a differential amplifier 4, a readout power control circuit 5, a switch 6, a readout power value storage circuit 7, a seek status detection circuit 8, and a data readout circuit 9. The optical head 2 comprises a semiconductor laser source 2a and a photodiode 2b. Laser light from a light beam emitted by the semiconductor laser source 2a is incident at the address region 15a of sector 15 of the optical disk 10 and is reflected therefrom. The laser light reflected at the address region 15a is incident on the photodiode 2b, where it undergoes photoelectric conversion, allowing the optical recording medium readout apparatus 1 to identify the sector address corresponding to the location of sector 15.

Furthermore, laser light emitted from the semiconductor laser source 2a is incident at the readout power control region 15b of sector 15 and is reflected therefrom. The laser light reflected at the readout power control region 15b, now containing information about a repeating pattern of short and long marks thereat, is incident on the photodiode 2b, where it undergoes photoelectric conversion to become a control readout signal. The control readout signal is input at the amplitude ratio detection circuit 3, where an average amplitude ratio is calculated. The average amplitude ratio and a target value for amplitude ratio are input at the differential amplifier 4, where a value is calculated by subtracting the target value from the average amplitude ratio. The readout power control circuit 5 outputs a signal indicating a value corresponding to an optimum readout power based on which the semiconductor laser source 2a can be controlled so as to cause the value calculated by the differential amplifier 4 to go to zero. The signal indicating a value corresponding to an optimum readout power which is output from the readout power control circuit 5 is input at the switch 6, and is also input at the readout power value storage circuit 7, where it is stored.

In accordance with a signal from the seek status detection circuit 8 which is connected to the optical head 2, the switch 6 causes either the readout power control circuit 5 or the readout power value storage circuit 7 to be electrically connected to the semiconductor laser source 2a, causing a drive current corresponding to the readout power value to be delivered to the semiconductor laser source 2a. The seek status detection circuit 8 detects the status of movement (hereinafter "seek") of the optical head 2 between tracks. When the seek status detection circuit 8 sends a detection signal to the switch 6 indicating that the optical head 2 is not in mid-seek, in accordance with such detection signal the switch 6 causes the readout power control circuit 5 to be electrically connected to the semiconductor laser source 2a. The semiconductor laser source 2a is thereafter driven with a drive current such as will produce an optimum readout power value as indicated by the signal output from the readout power control circuit 5, emitting laser light, and the laser light is incident at the data recording region 15c of sector 15, is reflected therefrom, and is incident on the photodiode 2b, where it undergoes photoelectric conversion to become a readout signal, and this is input at the data readout circuit 9. The foregoing sequence of events is repeated for sectors following sector 15 within the same track as sector 15, with the optimum readout power being reset to a new value for each sector. This allows readout information data to be output with a low error rate.

When the seek status detection circuit 8 delivers a detection signal to the switch 6 indicating that the optical head 2 has initiated a seek operation which will move it from the track containing sector 15 to the track containing sector 16, in accordance with such detection signal the switch 6 causes the readout power value storage circuit 7 to be electrically connected to the semiconductor laser source 2a. At this time, the semiconductor laser source 2a is supplied with a drive current such as will produce a readout power of value as indicated by the signal output from the readout power value storage circuit 7, which value is stored at the readout power value storage circuit 7, causing emission of laser light from the semiconductor laser source 2a. The readout power value stored at the readout power value storage circuit 7 is the value of the optimum readout power as determined for the sector immediately preceding the start of the seek operation; i.e., sector 15. Control based on amplitude ratio is temporarily suspended at such a time, with the readout power value delivered to the semiconductor laser source 2a being held fixed instead. Thereafter, when the seek operation is completed and the optical head 2 has finished moving to the track containing sector 16, the seek status detection circuit 8 sends a detection signal to the switch 6 indicating that the optical head 2 is not in mid-seek, upon which the switch 6 causes the readout power control circuit 5 to be electrically connected to the semiconductor laser source 2a. Thereafter, operations are as described above.

By thus providing each sector with a readout power control region, this being a region for recording marks for control of readout power, and detecting control readout signals for control of readout power at each sector, it is possible to carry out readout power control such that response occurs with short period and to track fluctuations in optimum readout power value with small lag time.

In the optical recording medium readout apparatus 1, the value of the readout power of the semiconductor laser source 2a when reading the readout power control region of sector 16 is held fixed at the readout power value which is stored at the readout power value storage circuit 7 at the time of the start of the seek operation to move to sector 16, i.e., at the time that control of readout power based on amplitude ratio is temporarily suspended. Because of the mutually different radial positions of the track containing sector 15, this being the location of the optical head 2 when readout power control is suspended, and the track containing sector 16, it is possible for there to be significant difference in tilt therebetween, this tilt being inclination due to warpage of the magneto-optical disk 10, runout and/or inclination of the shaft of the motor causing rotation of the magneto-optical disk 10, and so forth. While a change in tilt will, because of the resulting change in effective power, effective power being the actual readout power of the beam at the information recording surface of the magneto-optical disk 10, produce a change in the readout power necessary to produce an aperture of optimum size, i.e., in optimum readout power, because aperture size more or less corresponds to amplitude ratio and because readout power is being controlled so as to produce an amplitude ratio approaching a predetermined value, readout power following the seek operation, when the optical head 2 is at sector 16, will tend to approach an optimum readout power reflecting the amount of tilt at sector 16.

FIG. 13 is a graph showing results of actual measurements indicating the relationship between readout power and optimum amplitude ratio V2T/V8T when there is practically no tilt and when there is a large amount of tilt. Amplitude V2T is the value of an amplitude during detection of the short marks (hereinafter "short marks") present in the repeating pattern of short and long readout power control marks recorded in the readout power control region on the magneto-optical disk 10, and amplitude V8T is the value of an amplitude during detection of the long marks (hereinafter "long marks") present in the repeating pattern of short and long readout power control marks recorded in the readout power control region. Because optimum amplitude ratio V2T/V8T is on the order of 0.59 both when the optimum readout power at a time when there is practically no tilt, i.e., the readout power at a time when the error rate is at its lowest value, is 1.5 mW, and when optimum readout power at a time when there is a large amount of tilt is 1.7 mW, carrying out control of readout power so as to cause the amplitude ratio which is detected to always approach 0.59 will permit optimum readout power to always be maintained despite any variation in the amount of tilt.

Now, imagine that at the time of the start of a seek operation the readout power value is 1.45 mW due to error in the amplitude ratio detected when there is practically no tilt, this being smaller than the optimum readout power value of 1.5 mW. Starting a seek operation under such circumstances will cause readout power to be held at the value which is stored in the readout power value storage circuit 7, or 1.45 mW. Upon completion of the seek operation, while control of readout power based on amplitude ratio resumes with detection of the amplitude ratio at sector 16 with a readout power value of 1.45 mW, because of the large amount of tilt at sector 16 the amplitude ratio detected at sector 16 with a readout power value of 1.45 mW is 0.62.

Based on FIG. 13, the relationship between readout power and amplitude ratio when there is a large amount of tilt is such that amplitude ratio increases monotonically within a low readout power value domain, with amplitude ratio reaching a maximum near the point where readout power value is 1.55 mW, and amplitude ratio decreases monotonically within a high readout power value domain in which readout power value exceeds 1.55 mW. There are therefore two readout power values, 1.45 mW and 1.62 mW, which correspond to an amplitude ratio of 0.62, and the readout power control circuit 5 erroneously determines that the amplitude ratio of 0.62 which is detected at sector 16 corresponds to a readout power value not of 1.45 mW but of 1.62 mW. As a result, there is a lag in control response time because the readout power control circuit 5 attempts to alter the readout power by only an amount +0.08 mW obtained by subtracting the erroneously determined readout power value of 1.62 mW from the optimum readout power value of 1.7 mW corresponding to the target amplitude ratio, with the result that the semiconductor laser source 2a is controlled so as to deliver a readout power of 1.53 mW obtained by adding the +0.08 mW value which was obtained by subtraction above to the actual readout power value of 1.45 mW which exists at the time of completion of the seek operation, causing a lag in control response.

Furthermore, in the event that the readout power value at the time of the start of the seek operation is lower than the above value (1.45 mW), say 1.32 mW for example, starting the seek operation under such circumstances will cause readout power to be held at the value which is stored in the readout power value storage circuit 7, or 1.32 mW. Upon completion of the seek operation, while control of readout power based on amplitude ratio resumes with detection of the amplitude ratio at sector 16 with a readout power value of 1.32 mW, because of the large amount of tilt at sector 16 the amplitude ratio detected at sector 16 with a readout power value of 1.32 mW is 0.57. Based on FIG. 13, there are two readout power values, 1.32 mW and 1.75 mW, which correspond to an amplitude ratio of 0.57, and the readout power control circuit 5 erroneously determines that the amplitude ratio of 0.57 which is detected at sector 16 corresponds to a readout power value not of 1.32 mW but of 1.75 mW. As a result, not only is there is an even greater lag in control response because the readout power control circuit 5 attempts to alter the readout power by only an amount −0.05 mW obtained by subtracting the erroneously determined readout power value of 1.75 mW from the optimum readout power value of 1.7 mW corresponding to the target amplitude ratio, with the result that the semiconductor laser source 2a is controlled so as to deliver a readout power of 1.27 mW obtained by adding the −0.05 mW value which was obtained by subtraction above to the actual readout power value of 1.32 mW which exists at the time of completion of the seek operation, but because readout power is so low it becomes impossible to read the information recorded at the information recording surface of the magneto-optical disk 10, and in a worst-case scenario there is also the possibility that tracking servo and/or focus servo operations may become destabilized.

SUMMARY OF THE INVENTION

It is therefore an object of the invention to provide an optical recording medium readout apparatus capable of preventing abnormal control of readout power immediately following a seek operation.

The invention provides an optical recording medium readout apparatus comprising:

means for carrying out readout of information recorded on the optical recording medium by a light beam and for outputting a readout signal corresponding to readout information: and readout power control means for controlling a readout power of a light beam so as to reach a target value therefor based on an amplitude ratio obtained from readout signals produced by reading a plurality of types of marks on an optical recording medium, wherein the readout power control means sets readout power at a time when readout power control operations are next resumed following a temporary suspension thereof, so as to be greater than a readout power value at a point where change in amplitude ratio with respect to change in readout power goes from monotonically increasing to monotonically decreasing or from monotonically decreasing to monotonically increasing.

In accordance with the invention, because it is possible to cause readout power value at a time when readout power control operations resume to avoid abnormal power domains in which change in amplitude ratio with respect to change in readout power is not monotonically decreasing, instead entering or remaining in a normal readout power domain in which change in amplitude ratio with respect to change in readout power is monotonically decreasing, permitting readout power control operations to resume with a readout power value in the normal readout power domain, it is possible to thwart the possibility of occurrence of lag in response during readout power control operations, the possibility of divergent readout power control operations, and other such abnormal conditions.

Furthermore, in the invention it is preferable that the readout power control means includes readout power value storage means for storing a value of a readout power at a time when readout power control operations are temporarily suspended, and that the readout power control means employs as readout power value at a time when readout power control operations resume, a total value of a readout power value stored in the readout power value storage means and a predetermined value $\alpha$ which is not less than 0, or a value obtained by multiplying the readout power value stored in the readout power value storage means by a predetermined value $\beta$ which is not less than 1.

In accordance with the invention, because it is possible to cause the readout power value at a time when readout power control operations resume to be greater than the value of a readout power at a time when readout power control operations are temporarily suspended which is stored in the readout power value storage means, it is possible with a simple constitution to avoid abnormal power domains in which change in amplitude ratio with respect to change in readout power is not monotonically decreasing, instead entering or remaining in a normal readout power domain in which change in amplitude ratio with respect to change in readout power is monotonically decreasing, and it is possible to carry out readout power control operations with high reliability.

Furthermore, in the invention it is preferable that the readout power control means includes readout power value storage means for storing a value of a readout power at a time when readout power control operations are temporarily suspended, and temperature detection means for detecting an ambient temperature, and that the readout power control means employs as readout power value at a time when readout power control operations resume, a total value of a corrected power value which is obtained by correcting a readout power value stored in the readout power value storage means based on a temperature detected by the temperature detection means and a predetermined value $\alpha$ which is not less than 0, or a value obtained by multiplying the corrected power value by a predetermined value $\beta$ which is not less than 1.

In accordance with the invention, because it is possible to cause the readout power value at a time when readout power control operations resume to be greater than a corrected power value obtained by correcting based on a detected temperature a readout power at a time when readout power control operations are temporarily suspended which is stored in the readout power value storage means, despite the fact that an ambient temperature at a time when readout power control operations are temporarily suspended differs greatly from an ambient temperature at a time when readout power control operations resume, it is possible to carry out readout power control operations with still higher reliability.

Furthermore, in the invention it is preferable that the predetermined value $\alpha$ is not less than 0.2 mW, and the predetermined value $\beta$ is not less than 1.2.

In accordance with the invention, causing a predetermined value $\alpha$ which is not less than 0 to be not less than 0.2 mW, and causing a predetermined value $\beta$ which is not less than 1 to be not less than 1.2 makes it possible to cause the readout power value at a time when readout power control operations resume to be greater than the value of a readout power at a time when readout power control operations are temporarily suspended which is stored in a readout power value storage means.

Furthermore, in the invention it is preferable that the readout power control means employs as readout power value at a time when power control operations resume, a value which is on the order of a maximum allowable power value for an optical medium.

In accordance with the invention, causing the readout power value at a time when readout power control operations resume to be on the order of a maximum allowable power value for an optical medium makes it is possible to definitively avoid abnormal power domains in which change in amplitude ratio with respect to change in readout power is not monotonically decreasing, instead entering or remaining in a normal readout power domain in which change in amplitude ratio with respect to change in readout power is monotonically decreasing, making it possible to reduce to an extremely low level the possibility of divergent readout power control operations and other such abnormal conditions, making it possible to avoid accidental erasure or disruption of information recorded on the optical recording medium, and making it possible to carry out readout power control with extremely high reliability.

Furthermore, in the invention it is preferable that maximum power value read means for reading a maximum allowable power value for an optical recording medium which has been prerecorded on the optical recording medium is provided, and that the readout power control means employs as maximum allowable power value a maximum power value read by the maximum power value read means.

In accordance with the invention, because it is possible for a maximum allowable power value which has been prerecorded on an optical recording medium to be read by maximum power value read means, it is possible to carry out readout power control such that different maximum power values for optical recording media are used to carry out optimum readout power control differently for different optical recording media.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Figure 1:
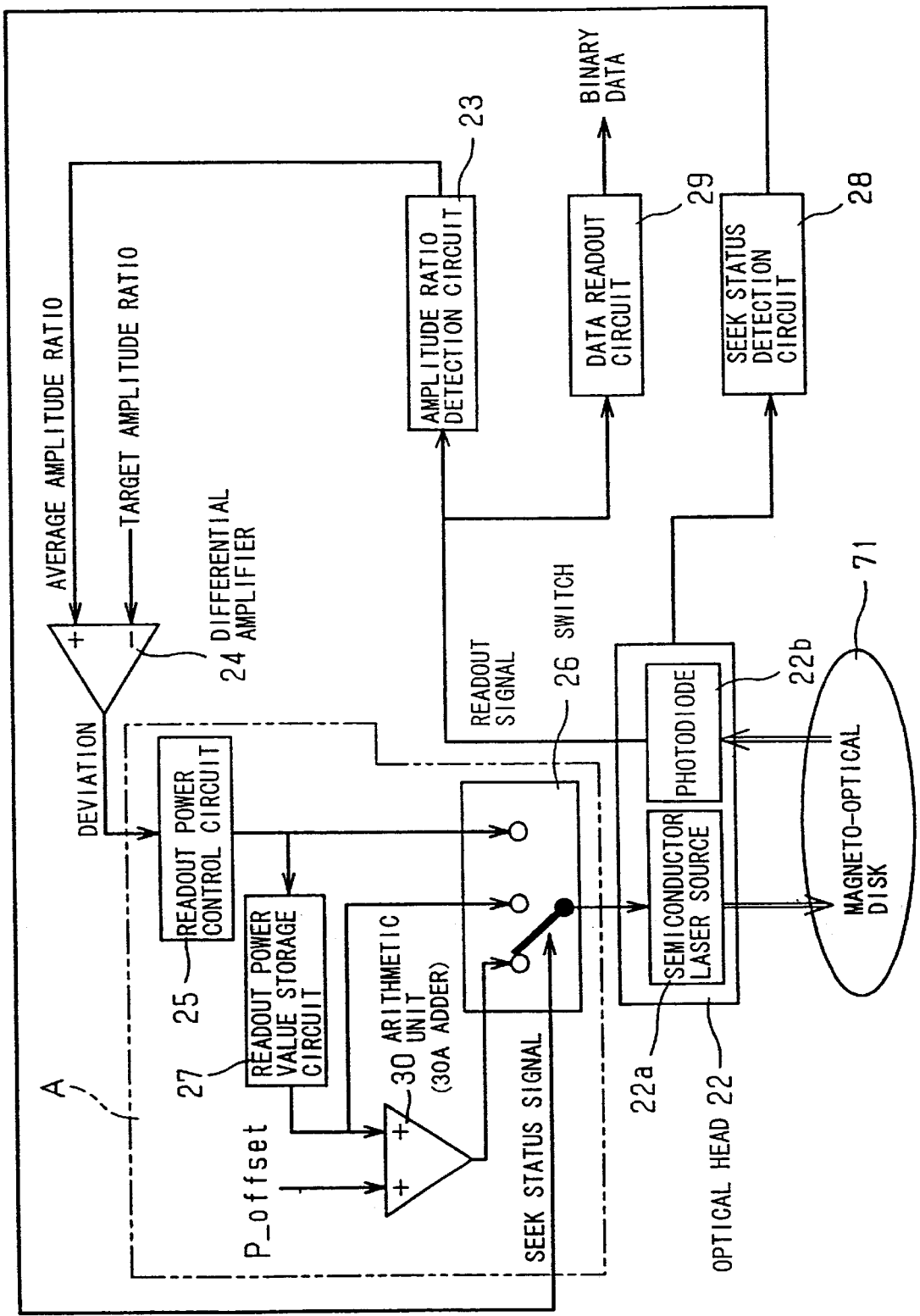
FIG. 1 is a block diagram showing the constitution of an optical recording medium readout apparatus in a first embodiment of the invention.

Now referring to the drawings, preferred embodiments of the invention are described below.

Figure 2:
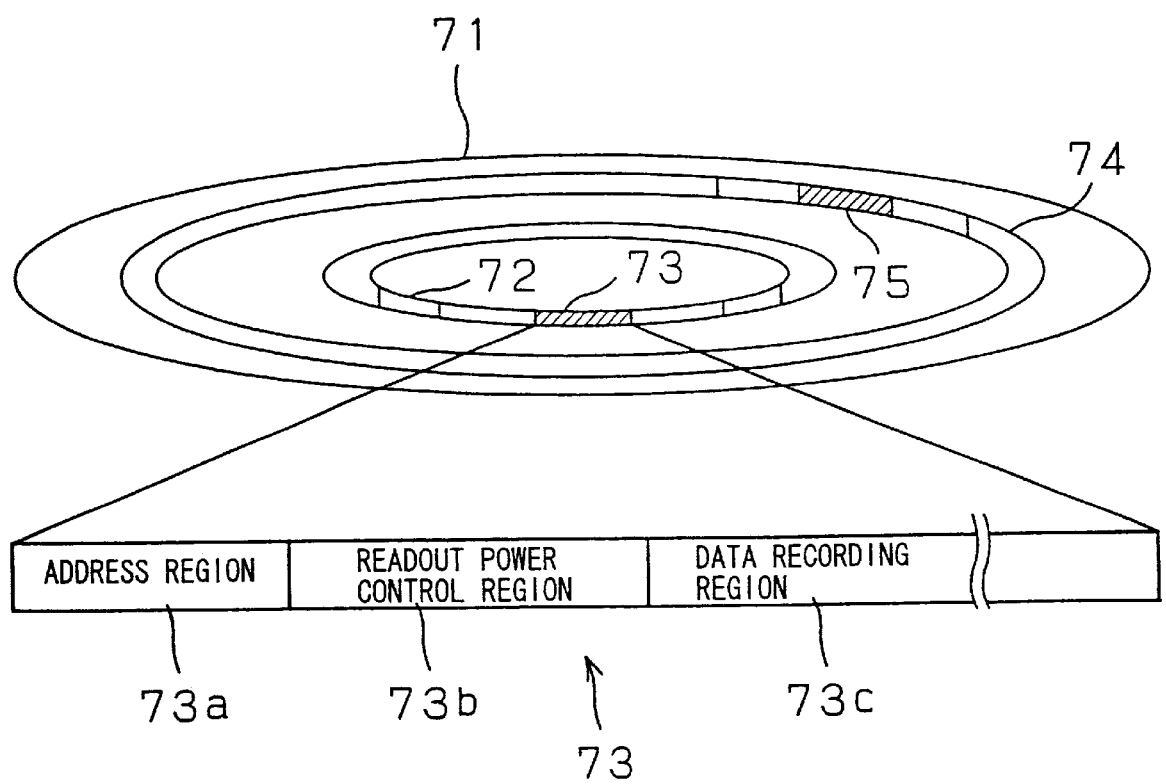
FIG. 2 is a diagram showing in simplified form the structure of a magneto-optical disk representing an optical recording medium capable of being read by the optical recording medium readout apparatus.

FIG. 1 is a block diagram showing the constitution of an optical recording medium readout apparatus 21 in a first embodiment of the invention. FIG. 2 is a diagram showing in simplified form the structure of a magneto-optical disk 71 representing an optical recording medium capable of being read by the optical recording medium readout apparatus 21. The optical recording medium readout apparatus 21 comprises an optical head 22, an amplitude ratio detection circuit 23, a differential amplifier 24, a readout power control circuit 25, a switch 26, a readout power value storage circuit 27, a seek status detection circuit 28, a data readout circuit 29, and an arithmetic unit 30. The optical head 22 comprises a semiconductor laser source 22a which is controlled by readout power control means comprising the readout power control circuit 25 and which emits laser light toward an information recording surface of the magneto-optical disk 71, and a photodiode 22b which receives laser light reflected from the information recording surface of the magneto-optical disk 71 and which outputs a readout signal produced as a result photoelectric conversion thereof.

A first track 72 on an information recording surface of a magneto-optical disk 71 has a first sector 73. The first sector 73 has an address region 73a, a readout power control region 73b, and a data recording region 73c. Information indicating where the sector possessing the address region is located on the information recording surface is recorded at the address region 73a. A predetermined repeating pattern of recorded marks of short length, or short marks (2T marks), and recorded marks of long length, or long marks (8T marks), representing recorded marks for control of readout power, is recorded at the readout power control region 73b. Audio data, video data, and/or other such digital data is recorded at the data recording region 73c. Furthermore, a second track 74 at a radial position different from that of the first track 72 on the information recording surface of the magneto-optical disk 71 has a second sector 75. Like the first sector 73, the second sector 75 has an address region 75a, a readout power control region 75b, and a data recording region 75c (not shown).

The data readout circuit 29, which is electrically connected to the photodiode 22b, outputs, as readout information data in the form of binary data, the digital data which is present within the readout signal output from the photodiode 22b, where laser light reflected at the information recording surface of the magneto-optical disk 71 undergoes photoelectric conversion. The seek status detection circuit 28 detects the status of movement (hereinafter "seek") of the optical head 22 between tracks on the information recording surface of the magneto-optical disk 71, and outputs a seek status signal indicating whether or not the optical head 22 is in mid-seek.

The amplitude ratio detection circuit 23, which is electrically connected to the photodiode 22b, detects a readout signal for control of readout power which is present within the readout signal output from the photodiode 22b, and outputs a signal indicating the value of an average amplitude ratio V2T/V8T obtained by dividing an amplitude V2T of a readout signal from the short marks within the recorded marks for control of readout power by an amplitude V8T of a readout signal from the long marks therein. The differential amplifier 24, which is electrically connected to the amplitude ratio detection circuit 23, outputs a signal indicating the value of a deviation which is obtained by subtracting a target amplitude ratio from the average amplitude ratio V2T/V8T indicated by the signal output from the amplitude ratio detection circuit 23.

Based on the deviation indicated by the signal output from the differential amplifier 24, the readout power control circuit 25, which is electrically connected to the differential amplifier 24, outputs a signal indicating an optimum readout power value such as will cause the deviation to approach zero. The readout power value storage circuit 27, representing readout power value storage means and being electrically connected to the readout power control circuit 25, stores a readout power value indicated by a signal output from the readout power control circuit 25 and outputs the stored readout power value. The arithmetic unit 30 is electrically connected to the readout power value storage circuit 27. In the present embodiment, the arithmetic unit 30 is an adder 30A, and outputs a signal indicating a value (P+P_offset) obtained by addition of a predetermined offset value P_offset which is not less than 0 to the readout power value P which is indicated by the signal output from the readout power value storage circuit 27.

The switch 26, which is electrically connected to the readout power control circuit 25; the readout power value storage circuit 27; the arithmetic unit 30 (adder 30A); and the semiconductor laser source 22a, selects one component from among the readout power control circuit 25; the readout power value storage circuit 27; and the arithmetic unit 30 (adder 30A) based on the seek status signal output from the seek status detection circuit 28, electrically connecting the selected component to the semiconductor laser source 22a, and causing a drive current to be delivered to the semiconductor laser source 22a such as will cause production of a readout power of value as indicated by the signal output from the readout power control circuit 25, the readout power value storage circuit 27, or the arithmetic unit 30 (adder 30A). In the present embodiment, the readout power control means comprises at least the readout power control circuit 25, the switch 26, and the arithmetic unit 30 (adder 30A).

Figure 3:
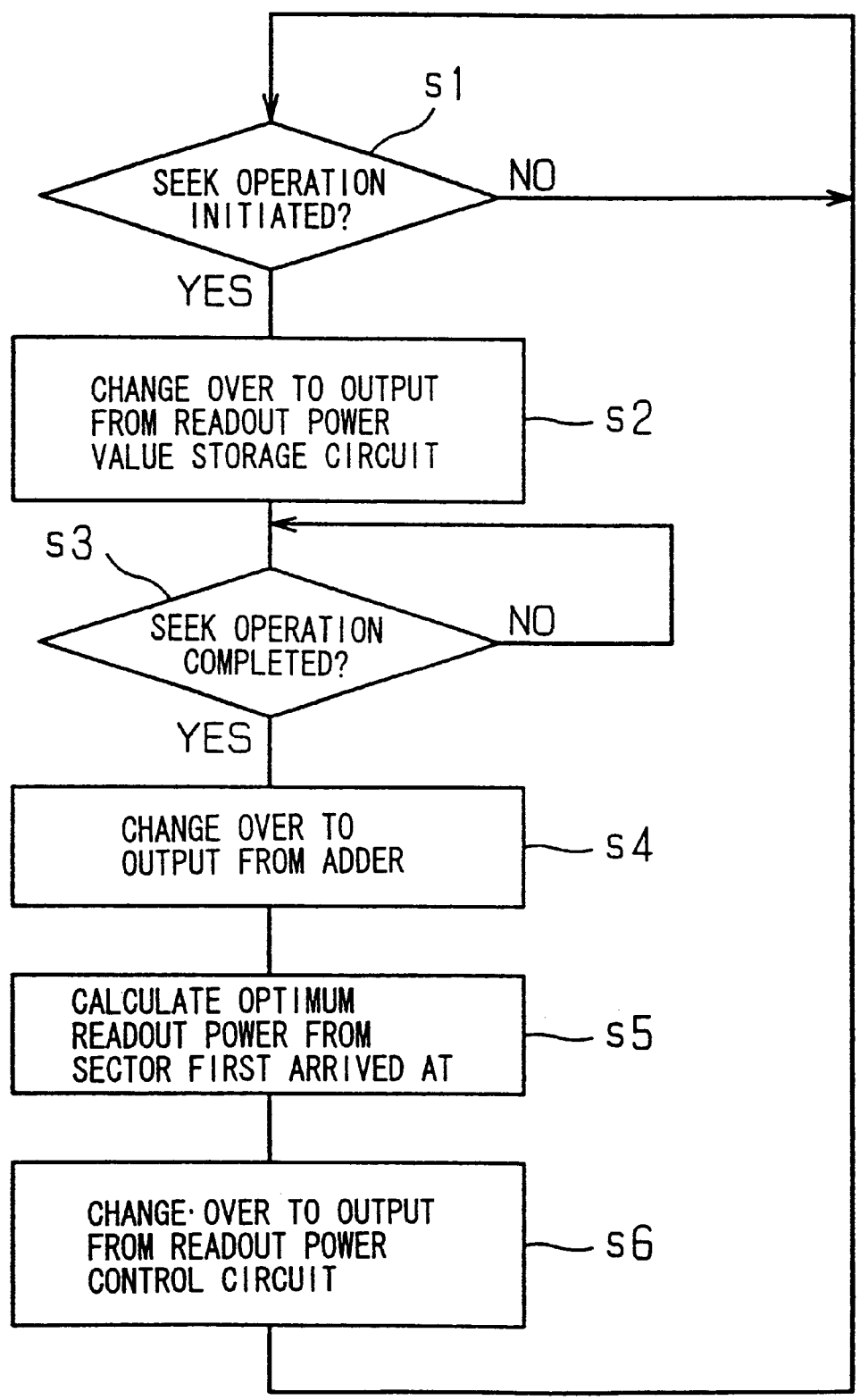
FIG. 3 is a flowchart showing a sequence of switching operations associated with a switch at the optical recording medium readout apparatus.

FIG. 3 is a flowchart showing a sequence of switching operations associated with a switch 26 at the optical recording medium readout apparatus 21. At step s1, the sequence of operations begins with determination by the seek status detection circuit 28 of whether or not the optical head 22 has initiated a seek operation. At step s1, if the seek status detection circuit 28 determines that the optical head 22 has initiated a seek operation then processing proceeds to step s2, but if the seek status detection circuit 28 determines that the optical head 22 has not initiated a seek operation then processing returns to step s1. The state of switch 26 prior to initiation of a seek operation by the optical head 22 is such that the readout power control circuit 25 is connected to the semiconductor laser source 22a, at which time a drive current is delivered to the semiconductor laser source 22a such as will cause production of an optimum readout power of value as indicated by the signal output from the readout power control circuit 25.

At step s2, upon receipt by the switch 26 of a seek status signal from the seek status detection circuit 28 indicating that the optical head 22 has initiated a seek operation, the switch 26 goes from a condition such that the readout power control circuit 25 is connected to the semiconductor laser source 22a to a condition such that the readout power value storage circuit 27 is connected to the semiconductor laser source 22a, at which time a drive current is delivered to the semiconductor laser source 22a such as will cause production of a readout power of value as indicated by the signal output from the readout power value storage circuit 27, which value is the value stored at the readout power value storage circuit 27 and is the value of the readout power at the start of the seek operation, and processing proceeds to step s3.

At step s3, the seek status detection circuit 28 determines whether or not the optical head 22 has completed the seek operation. At step s3, if the seek status detection circuit 28 determines that the optical head 22 has completed the seek operation then processing proceeds to step s4, but if the seek status detection circuit 28 determines that the optical head 22 has not completed the seek operation then processing returns to step s3.

At step s4, upon receipt by the switch 26 of a seek status signal from the seek status detection circuit 28 indicating that the optical head 22 has completed the seek operation, the switch 26 goes from a condition such that the readout power value storage circuit 27 is connected to the semiconductor laser source 22a to a condition such that the arithmetic unit 30 (adder 30A) is connected to the semiconductor laser source 22a, at which time a drive current is delivered to the semiconductor laser source 22a such as will cause production of a readout power of value as indicated by the signal from the arithmetic unit 30 (adder 30A), which value is obtained by addition of a predetermined offset value P_offset which is not less than 0 to the readout power value stored at the readout power value storage circuit 27, this latter value being the value of the readout power at the start of the seek operation, and processing proceeds to step s5.

At step s5, readout power control operations resume, with the deviation between the target amplitude ratio and the average amplitude ratio from the recorded marks for control of readout power in the readout power control region at the sector at which the optical head 22 first arrives following completion of the seek operation being calculated by the differential amplifier 24, the readout power control circuit 25 calculating an optimum readout power for the sector based on the deviation and outputting a signal indicating the value of that optimum readout power, and processing proceeds to step s6.

At step s6, upon output by the readout power control circuit 25 of a signal indicating the optimum readout power value, the switch 26 goes from a condition such that the arithmetic unit 30 (adder 30A) is connected to the semiconductor laser source 22a to a condition such that the readout power control circuit 25 is connected to the semiconductor laser source 22a, at which time a drive current is delivered to the semiconductor laser source 22a such as will cause production of an optimum readout power of value as indicated by the signal output from the readout power control circuit 25, and processing returns to step s1.

Figure 4:
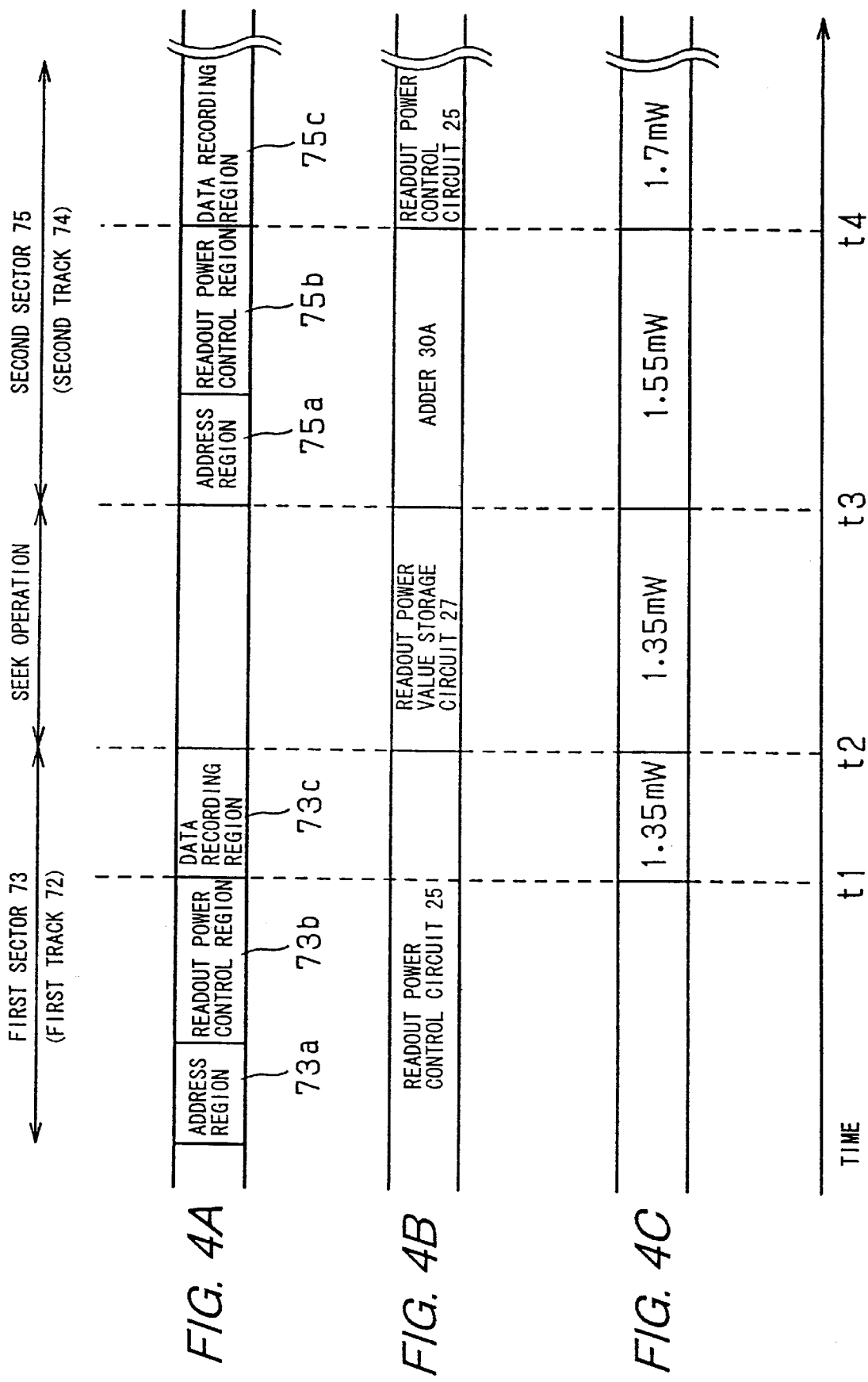
FIGS. 4A through 4C are timing charts showing events occurring at the optical recording medium readout apparatus at times proximate to occurrence of a seek operation carried out by an optical head, FIG. 4A indicating locations on an information recording surface of the magneto-optical disk which are sequentially irradiated by laser light emitted from a semiconductor laser source, FIG. 4B showing different upstream components to which the semiconductor laser source is connected in accordance with selection by the switch, and FIG. 4C showing the value of the readout power of the semiconductor laser source.

FIGS. 4A through 4C are timing charts showing events occurring at the optical recording medium readout apparatus 21 at times proximate to occurrence of the seek operation carried out by the optical head 22, FIG. 4A indicating locations on the information recording surface of the magneto-optical disk 71 which are sequentially irradiated by laser light emitted from the semiconductor laser source 22a, FIG. 4B showing the different upstream components to which the semiconductor laser source 22a is connected in accordance with selection by the switch 26, and FIG. 4C showing the value of the readout power of the semiconductor laser source 22a.

Figure 5:
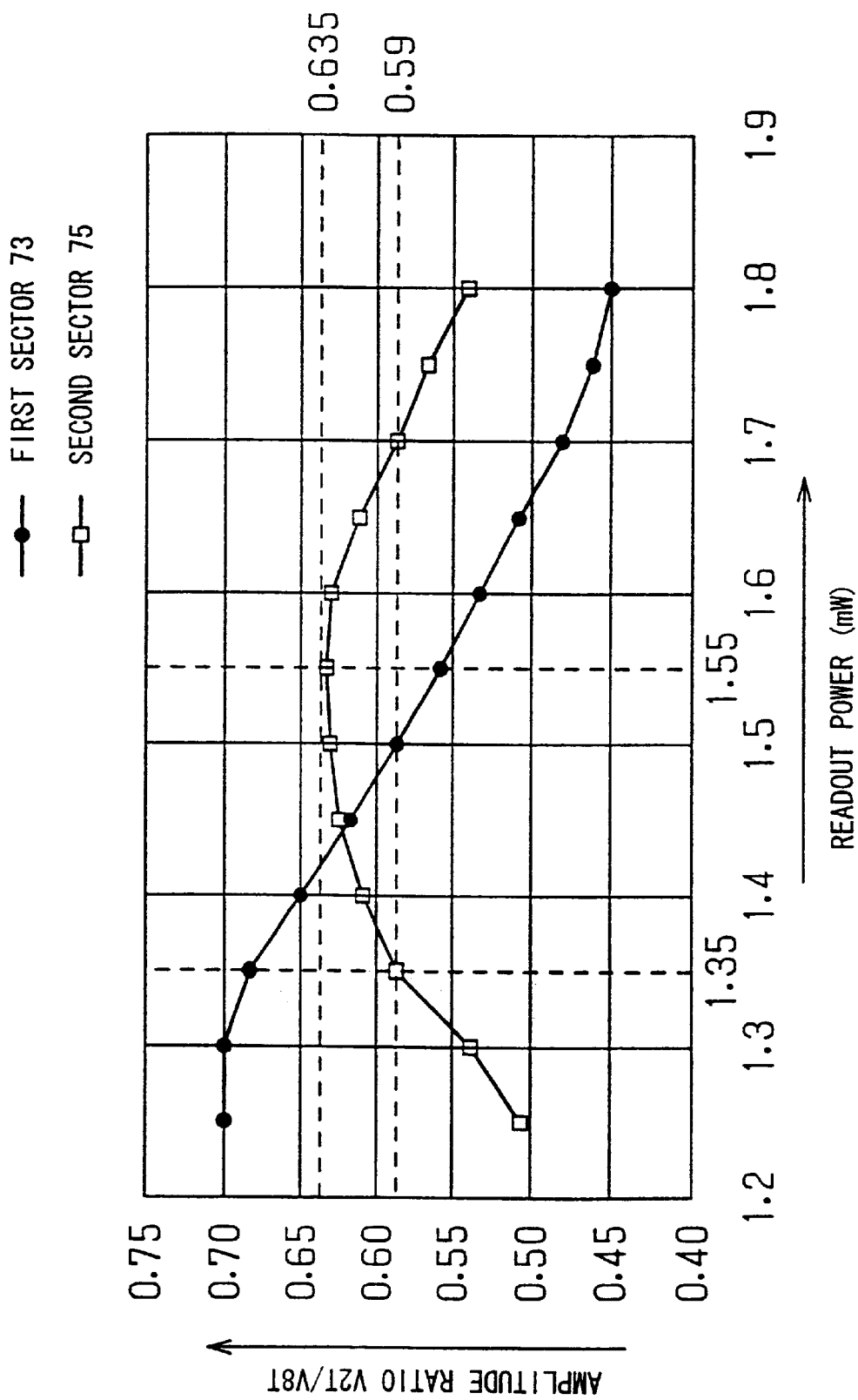
FIG. 5 is a graph showing the relationship between the value of readout power at the semiconductor laser source when at a first sector in a first track on a readout and recording surface of a magneto-optical disk in the optical recording medium readout apparatus and when at a second sector in a second track thereon, and an average amplitude ratio V2T/V8T corresponding to the readout power values.

FIG. 5 is a graph showing the relationship between the value of readout power at the semiconductor laser source 22a when at the first sector 73 in the first track 72 on the readout and recording surface of the magneto-optical disk 71 in the optical recording medium readout apparatus 21 and when at the second sector 75 in the second track 74 thereon, and the average amplitude ratio V2T/V8T corresponding to the readout power values. In the example presented here, there is no tilt at the first sector 73, but there is a large amount of tilt at the second sector 75. Furthermore, in the example, the value of the predetermined offset P offset which is not less than 0 and which is input at the adder 30A is taken to be 0.2 mW.

At time t1, irradiation of the data recording region 73c of the first sector 73 in the first track 72 by laser light emitted from the semiconductor laser source 22a begins. At this time, the switch 26 is such that the readout power control circuit 25 is connected to the semiconductor laser source 22a. The value of the readout power which is output from the readout power control circuit 25 is set at 1.35 mW based on the deviation between the target amplitude ratio and the average amplitude ratio from the recorded marks for control of readout power in the readout power control region 73b of the first sector 73 at a time prior to time t1, and the readout power value of 1.35 mW is also stored at the readout power value storage circuit 27. While the optimum readout power for the target amplitude ratio of 0.59 at the first sector 73 is 1.55 mW, let us assume that the readout signal output from the photodiode 22b contains error due to the effects of noise and the like, as a result of which there is a 10% error in the optimum readout power, causing it to be 1.35 mW.

At time t2, upon initiation of a seek operation to move the optical head 22 to the second track 74, the seek status detection circuit 28 detects this fact and delivers to the switch 26 a seek status signal indicating that the optical head 22 has initiated a seek operation, upon receipt of which the switch 26, based on the seek status signal, goes from a condition such that the readout power control circuit 25 is connected to the semiconductor laser source 22a to a condition such that the readout power value storage circuit 27 is connected to the semiconductor laser source 22a. At this time, performance of readout power control operations by the readout power control means is temporarily suspended. As a result, during the period that the seek operation is taking place a drive current is delivered to the semiconductor laser source 22a such as will cause production of a readout power of value 1.35 mW, this being the value stored at the readout power value storage circuit 27.

At time t3, upon completion of the seek operation to move the optical head 22 to the second track 74, the seek status detection circuit 28 detects this fact and delivers to the switch 26 a seek status signal indicating that the optical head 22 has completed the seek operation, upon receipt of which the switch 26, based on the seek status signal, goes from a condition such that the readout power value storage circuit 27 is connected to the semiconductor laser source 22a to a condition such that the adder 30A is connected to the semiconductor laser source 22a. At this time, a drive current is delivered to the semiconductor laser source 22a such as will cause production of a readout power of value 1.35 mW+0.2 mW=1.55 mW, this value being obtained by addition by the adder 30A of a predetermined offset value P_offset=0.2 mW which is not less than 0 to the readout power value of 1.35 mW, this latter value being the value stored at the readout power value storage circuit 27 and being the value of the readout power at the start of the seek operation, and performance of readout power control operations by the readout power control means is resumed.

Laser light emitted from the semiconductor laser source 22a, driven to produce a readout power of value 1.55 mW, and reflected from the readout power control region 75b of the second sector 75 is received by the photodiode 22b, a readout signal for control of readout power which is present within the readout signal output from the photodiode 22b is detected by the amplitude ratio detection circuit 23, and an average amplitude ratio of 0.635 is calculated based on the recorded marks for control of readout power at the readout power control region 75b of the second sector 75. The differential amplifier 24 calculates the deviation between the target amplitude ratio of 0.59 and the average amplitude ratio of 0.635, and the readout power control circuit 25 sets the optimum readout power for the second sector 75 to a value of 1.7 mW based on this deviation.

At time t4, upon output by the readout power control circuit 25 of a signal indicating an optimum readout power value of 1.7 mW, the switch 26 goes from a condition such that the arithmetic adder 30A is connected to the semiconductor laser source 22a to a condition such that the readout power control circuit 25 is connected to the semiconductor laser source 22a. During the period when laser light emitted from the semiconductor laser source 22a irradiates the data recording region 75c of the second sector 75, the readout power control circuit 25 delivers a drive current to the semiconductor laser source 22a such as will cause production of an optimum readout power of value 1.7 mW.

By causing the readout power value at a time when readout power control operations resume to be greater than the value of a readout power at a time when readout power control operations are temporarily suspended, i.e., at a time when the optical head 22 initiates a seek operation, which is stored in the readout power value storage circuit 27, because the optical recording medium readout apparatus 21 of the present embodiment makes it possible to cause the value of the readout power at the time when readout power control operations resume, i.e., at the time of completion of the seek operation performed by the optical head 22, to avoid abnormal power domains in which change in the average amplitude ratio V2T/V8T with respect to change in readout power is not monotonically decreasing, instead entering or remaining in a normal readout power domain in which change in the amplitude ratio with respect to change in readout power is monotonically decreasing, permitting readout power control operations to resume with a readout power value in the normal readout power domain, it is possible to thwart the possibility of occurrence of lag in response during readout power control operations, the possibility of divergent readout power control operations, and other such abnormal conditions. As a result, it is possible to carry out readout power control operations with high reliability.

In the present embodiment, from FIG. 5 it can be confirmed that the possibility of occurrence of divergent readout power control can be avoided even when going from a situation where the optimum power value contains an error on the order of −10% with practically no tilt to a situation where there is an extremely large amount of tilt following completion of a seek operation when the value of the predetermined offset P_offset which is not less than 0 is not less than 0.2 mW. It is therefore desirable that the value of the predetermined offset P_offset which is not less than 0 be not less than 0.2 mW.

Figure 6:
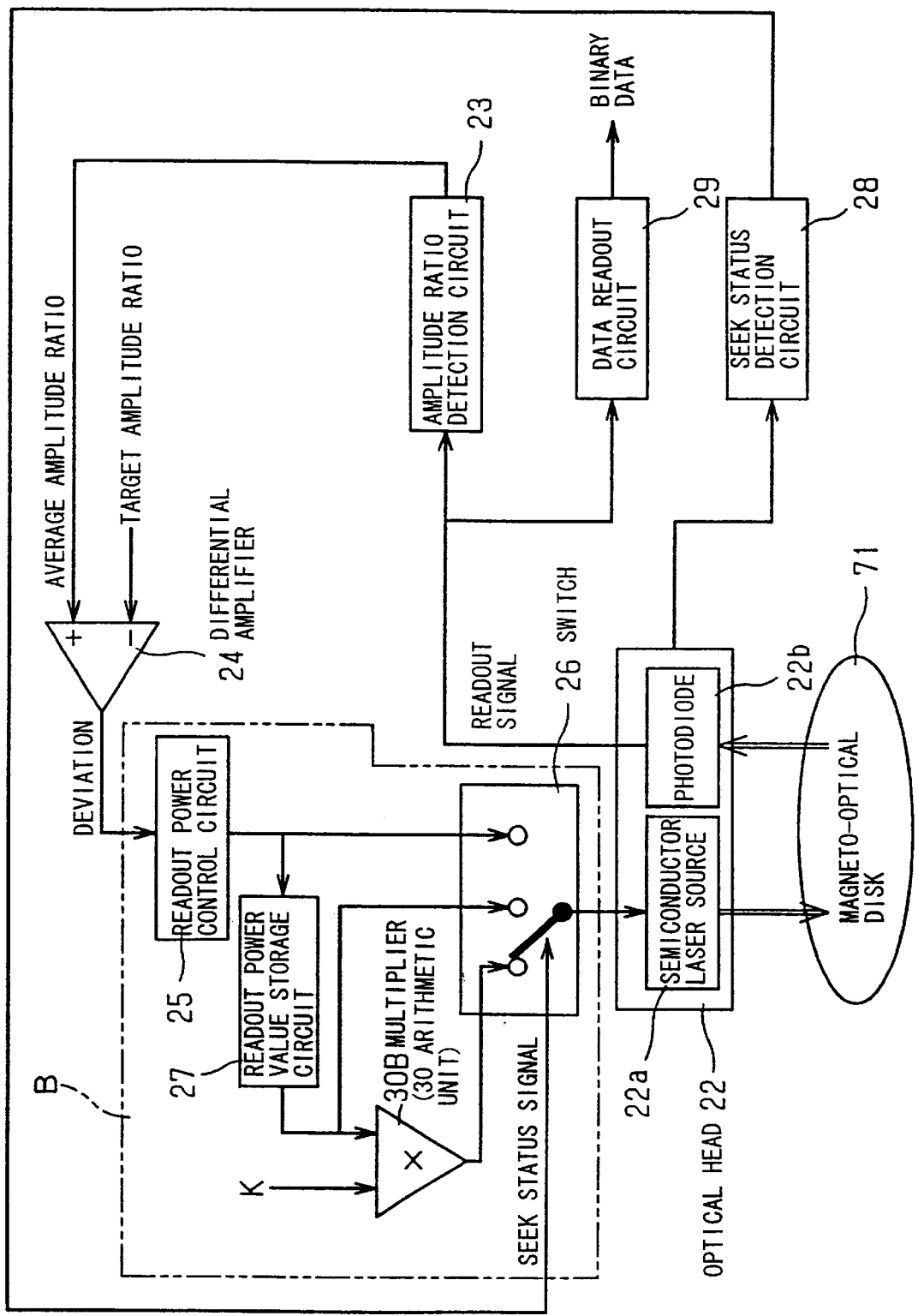
FIG. 6 is a block diagram showing the constitution of an optical recording medium readout apparatus in a second embodiment of the invention.

FIG. 6 is a block diagram showing the constitution of an optical recording medium readout apparatus 21A in a second embodiment of the invention. The optical recording medium readout apparatus 21A is constructed such that a multiplier 30B is employed as the arithmetic unit 30 of the optical recording medium readout apparatus 21 in the first embodiment. That is, the optical recording medium readout apparatus 21A has such a constitution that section A of FIG. 1 is replaced with section B of FIG. 6. The multiplier 30B outputs a signal indicating a readout power value P×K obtained by multiplication of the readout power value P which is indicated by the signal output from the readout power value storage circuit 27 by a predetermined factor K which is not less than 1. Readout power control operations are in all other respects similar to the readout power control operations of the optical recording medium readout apparatus 21 in the first embodiment. That is, inasmuch as the multiplier 30B can be understood to produce an effect equivalent to production of a readout power value P×K obtained by addition of a predetermined offset value P×(K−1) which is not less than 0 to the readout power value P stored in the readout power value storage circuit 27, it is possible to obtain an effect similar to that produced by the optical recording medium readout apparatus 21 wherein the adder 30A is employed as the arithmetic unit 30.

In the present embodiment, from FIG. 5 it can be confirmed that the possibility of occurrence of divergent readout power control can be avoided even when going from a situation where the optimum power value contains an error on the order of −10% with practically no tilt to a situation where there is an extremely large amount of tilt following completion of a seek operation when the value of the predetermined factor K which is not less than 1 is not less than 1.2. It is therefore desirable that the value of the predetermined factor K which is not less than 1 be not less than 1.2.

Figure 7:
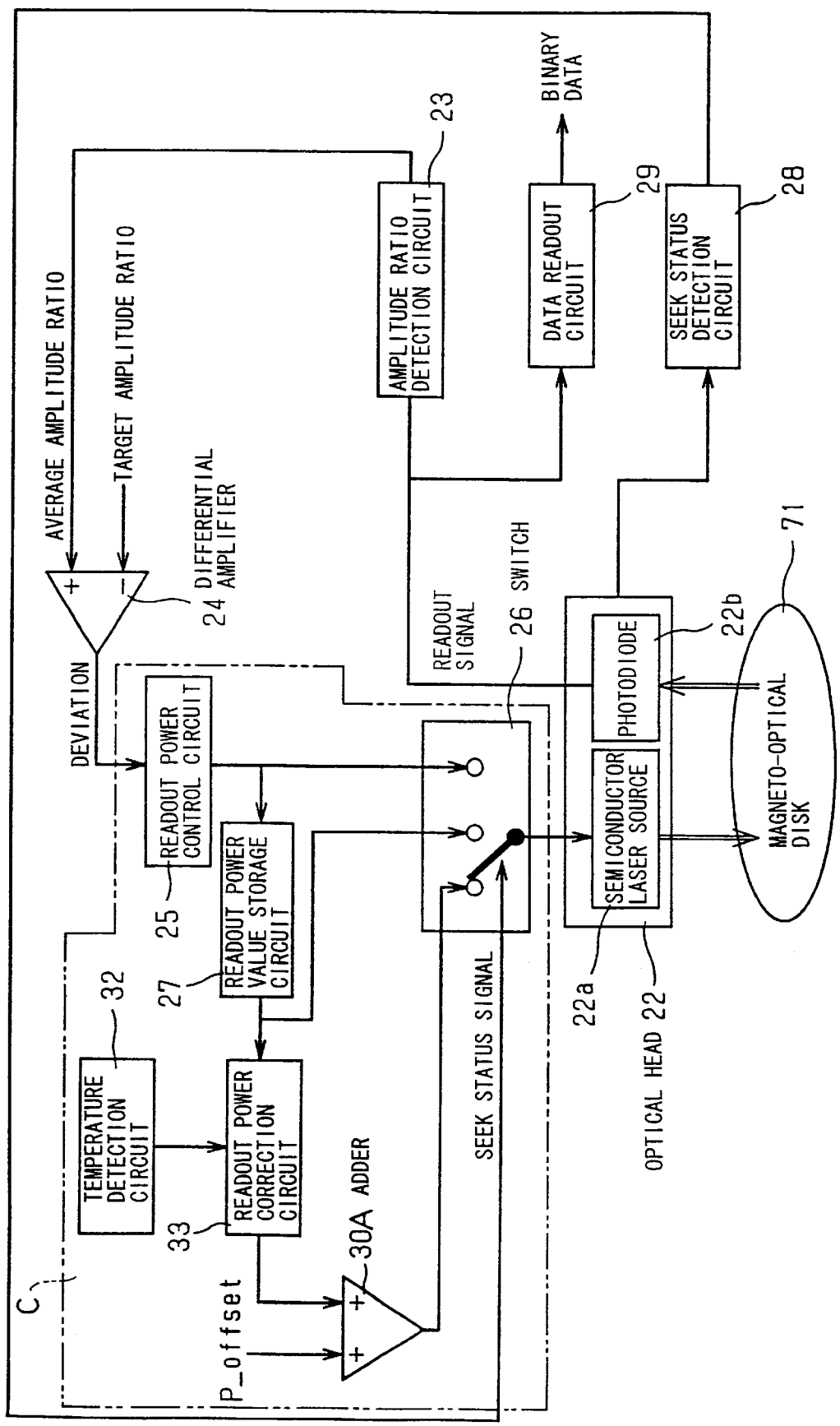
FIG. 7 is a block diagram showing the constitution of an optical recording medium readout apparatus in a third embodiment of the invention.

FIG. 7 is a block diagram showing the constitution of an optical recording medium readout apparatus 21B in a third embodiment of the invention. In the optical recording medium readout apparatus 21B, a temperature detection circuit 32 and a readout power correction circuit 33 are present in addition to the components of the optical recording medium readout apparatus 21 in the first embodiment, the optical recording medium readout apparatus 21B being constituted such that the readout power correction circuit 33 is electrically connected between the readout power value storage circuit 27 and the adder 30A serving as the arithmetic unit 30, and the temperature detection circuit 32 is electrically connected to the readout power correction circuit 33. That is, the optical recording medium readout apparatus 21B has such a constitution that section A of FIG. 1 is replaced with section C of FIG. 7.

The temperature detection circuit 32, representing temperature detection means, detects an ambient temperature of the optical recording medium readout apparatus 21B and outputs a signal indicating same. Based on the ambient temperature detected by the temperature detection circuit 32, the readout power correction circuit 33 corrects the readout power value stored in the readout power value storage circuit 27, which is the value of the readout power at the time of the start of a seek operation, and delivers to the adder 30A a signal indicating the power value so corrected. Readout power control operations are in all other respects similar to the readout power control operations of the optical recording medium readout apparatus 21 in the first embodiment.

Because the optical recording medium readout apparatus 21B of the present embodiment makes it possible to cause the readout power value at a time when readout power control operations resume, i.e., at the time of completion of a seek operation performed by the optical head 22, to be greater than a corrected power value obtained by correcting based on a detected temperature a readout power at a time when readout power control operations are temporarily suspended, i.e., at a time when the optical head 22 initiates the seek operation, which is stored in the readout power value storage circuit 27, despite the fact that an ambient temperature at the time when readout power control operations are temporarily suspended differs greatly from an ambient temperature at the time when readout power control operations resume, and in particular when there is an extreme drop in ambient temperature therebetween, it is possible to carry out readout power control operations with still higher reliability.

Whereas the optical recording medium readout apparatus 21B of the third embodiment of the invention employs the adder 30A as the arithmetic unit 30, it is also possible to employ a multiplier 30B in place of the adder 30A, in which case it will be possible to obtain similar effect thereby.

Figure 8:
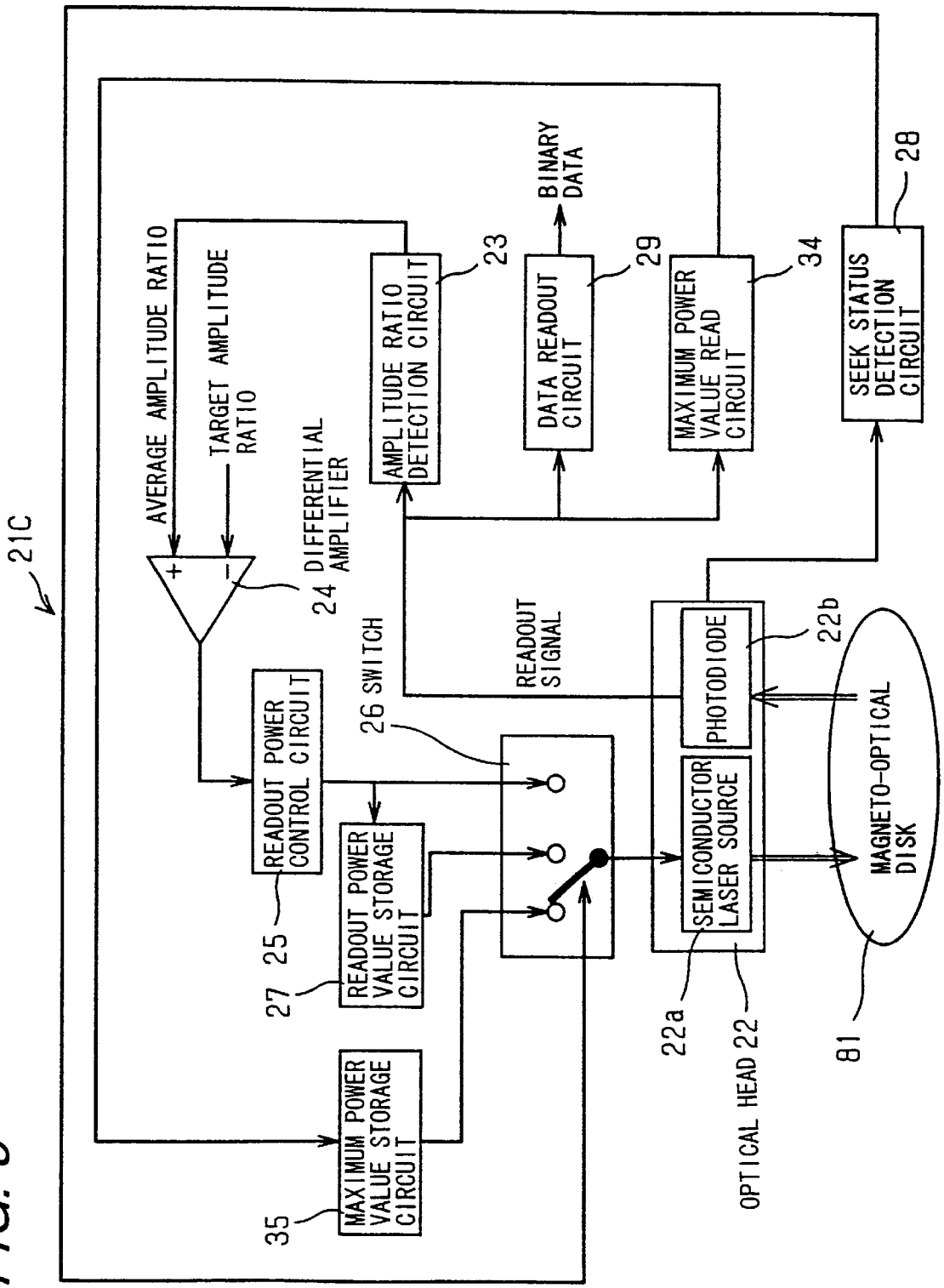
FIG. 8 is a block diagram showing the constitution of an optical recording medium readout apparatus in a fourth embodiment of the invention.

FIG. 8 is a block diagram showing the constitution of an optical recording medium readout apparatus 21C in a fourth embodiment of the invention. The constitution of the optical recording medium readout apparatus 21C is such that the arithmetic unit 30 of the optical recording medium readout apparatus 21 in the first embodiment is eliminated, with addition of a maximum power value read circuit 34 and a maximum power value storage circuit 35.

Figure 9:
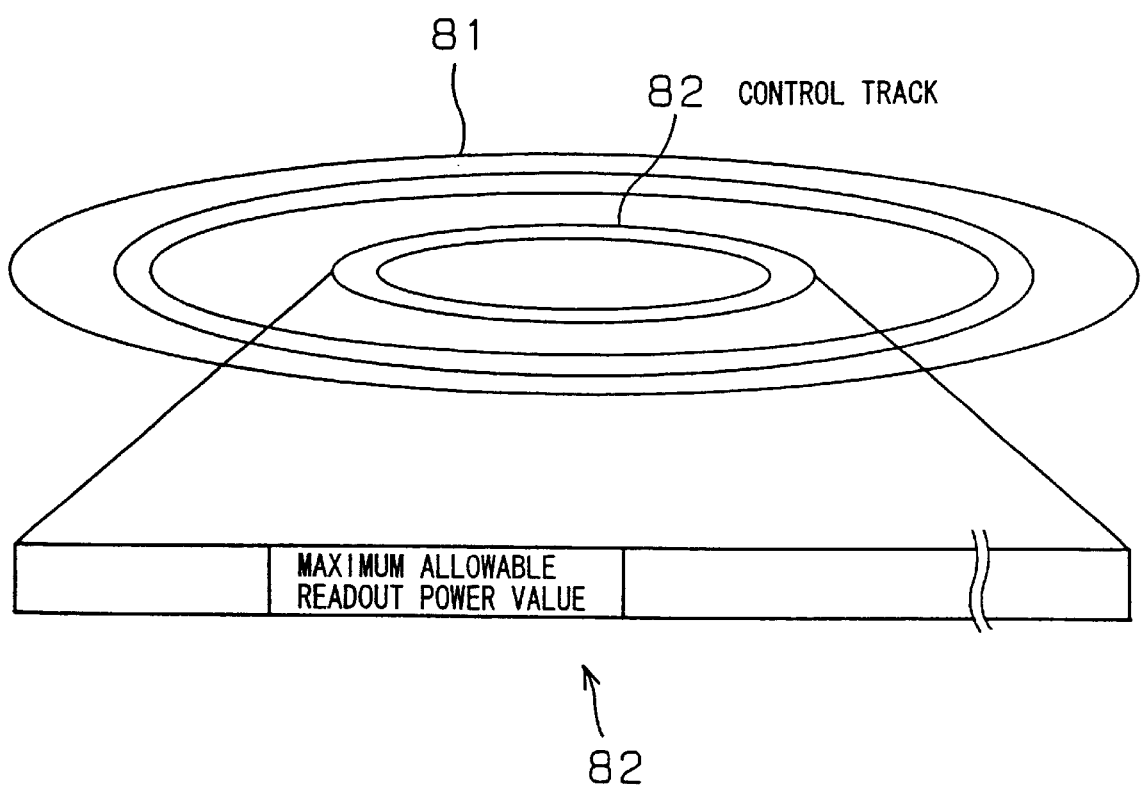
FIG. 9 is a simplified diagram showing the structure of a magneto-optical disk representing an optical recording medium capable of being read by the optical recording medium readout apparatus of the fourth embodiment of the invention.

FIG. 9 is a simplified diagram showing the structure of a magneto-optical disk 81 representing an optical recording medium capable of being read by the optical recording medium readout apparatus 21C of the fourth embodiment. The magneto-optical disk 81 has a control track 82 at a predetermined region on an information recording surface thereof. Recorded at the control track 82 is information related to the recording and/or readout characteristics of the magneto-optical disk 81, such as a maximum allowable readout power value such as will prevent erasure or disruption of information recorded on the information recording surface of the magneto-optical disk 81.

At the optical recording medium readout apparatus 21C, the maximum power value read circuit 34, which represents maximum power value read means and which is electrically connected to the photodiode 22b, detects a maximum allowable readout power value which is present within the readout signal from the control track 82 of the magneto-optical disk 81 produced by the photodiode 22b through photoelectric conversion, and outputs a signal indicating such value to the maximum power value storage circuit 35. The maximum power value storage circuit 35, being electrically connected to the maximum power value read circuit 34 and the switch 26, stores the maximum allowable readout power value delivered thereto from the maximum power value read circuit 34, and outputs a signal indicating the maximum allowable readout power value to the switch 26. The operations causing this maximum allowable readout power value to be stored are carried out at a time when the magneto-optical disk 81 is mounted in the optical recording medium readout apparatus 21C.

Based on the seek status signal output from the seek status detection circuit 28, the switch 26 selects one component from among the readout power control circuit 25; the readout power value storage circuit 27; and the maximum power value storage circuit 35, electrically connecting the selected component to the semiconductor laser source 22a. In the present embodiment, the readout power control means comprises at least the readout power control circuit 25, the switch 26, and the maximum power value storage circuit 35.

Figure 10:
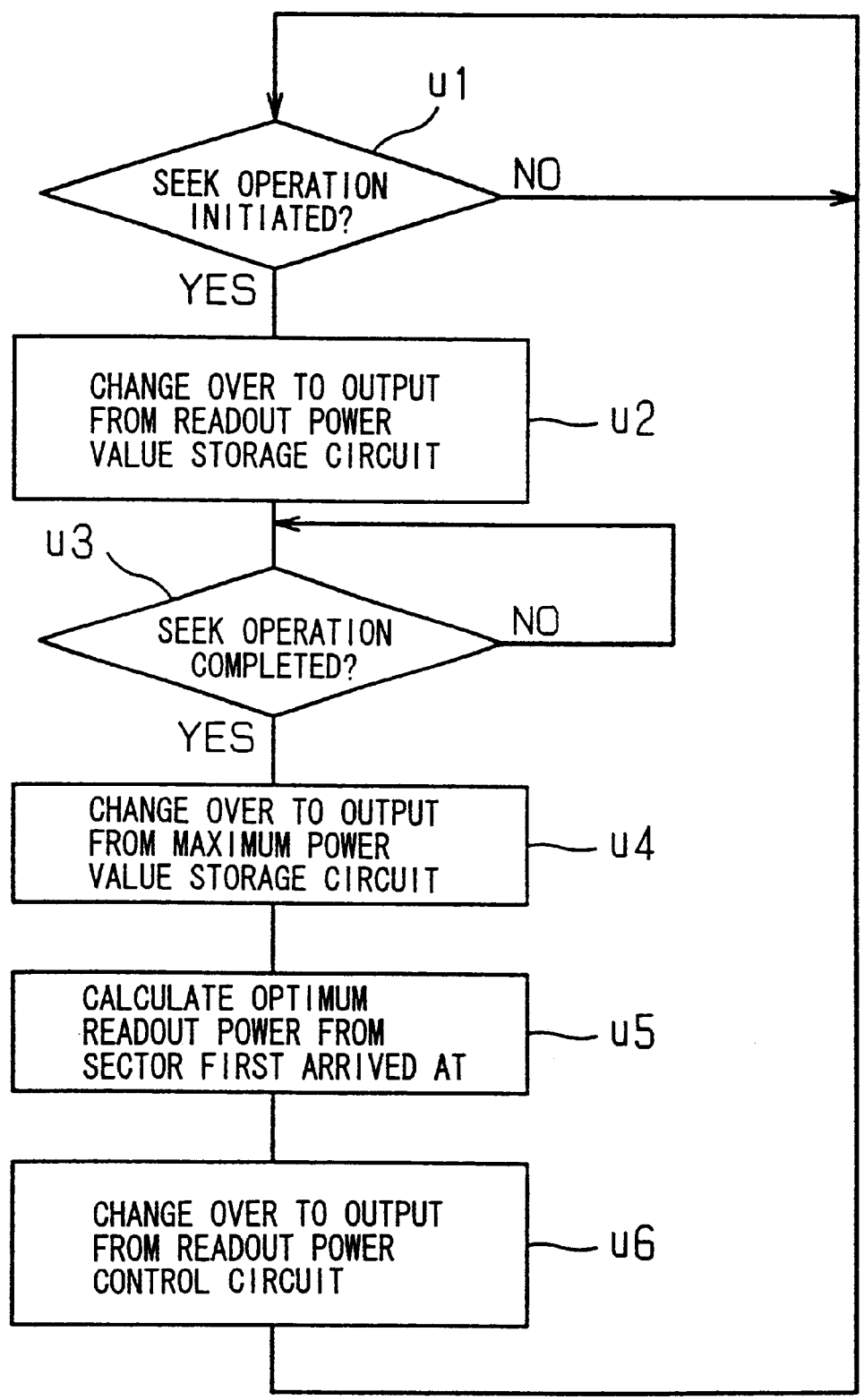
FIG. 10 is a flowchart showing a sequence of switching operations associated with a switch at the optical recording medium readout apparatus.
Figure 11:
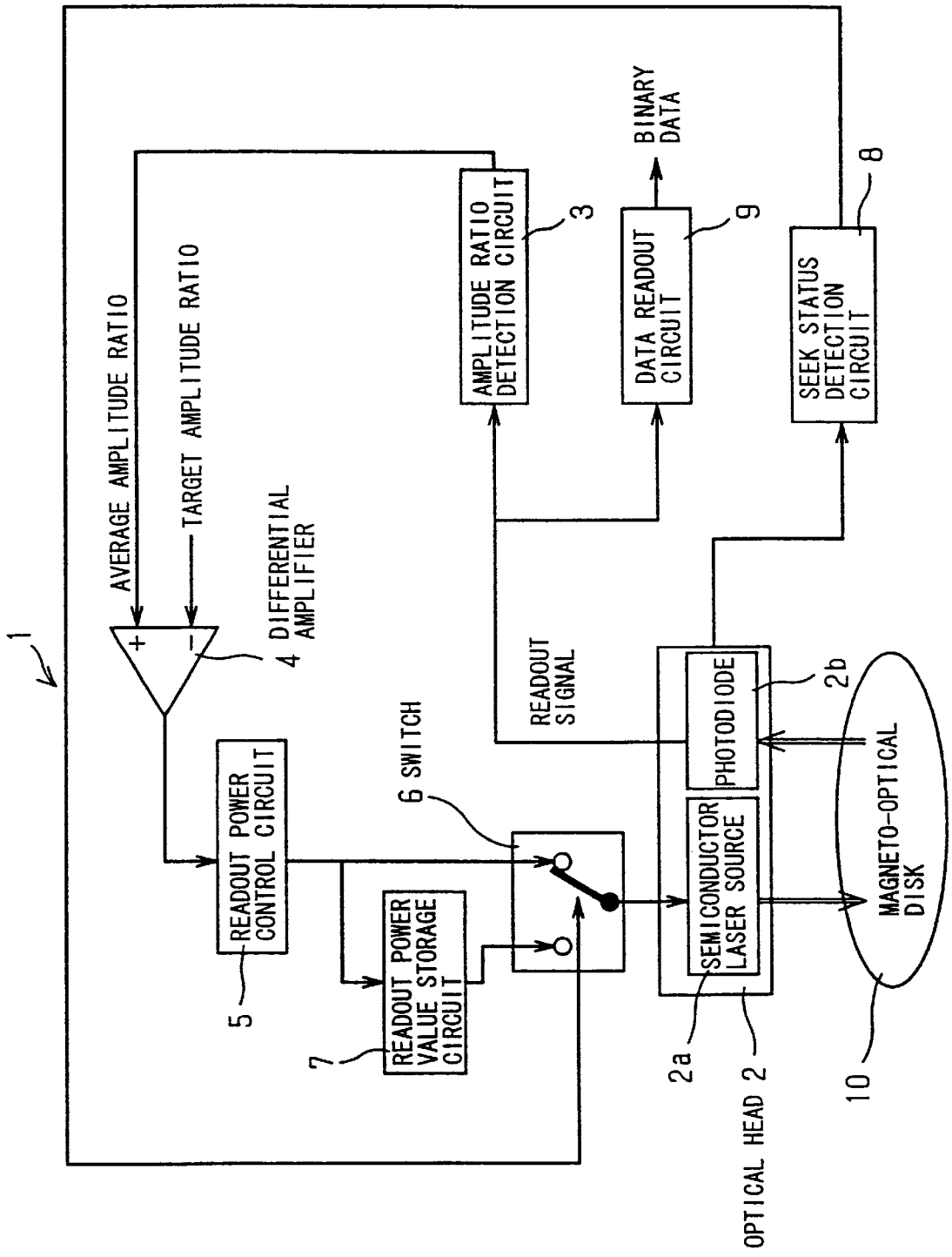
FIG. 11 is a block diagram showing the constitution of an optical recording medium readout apparatus in the conventional art.
Figure 12:
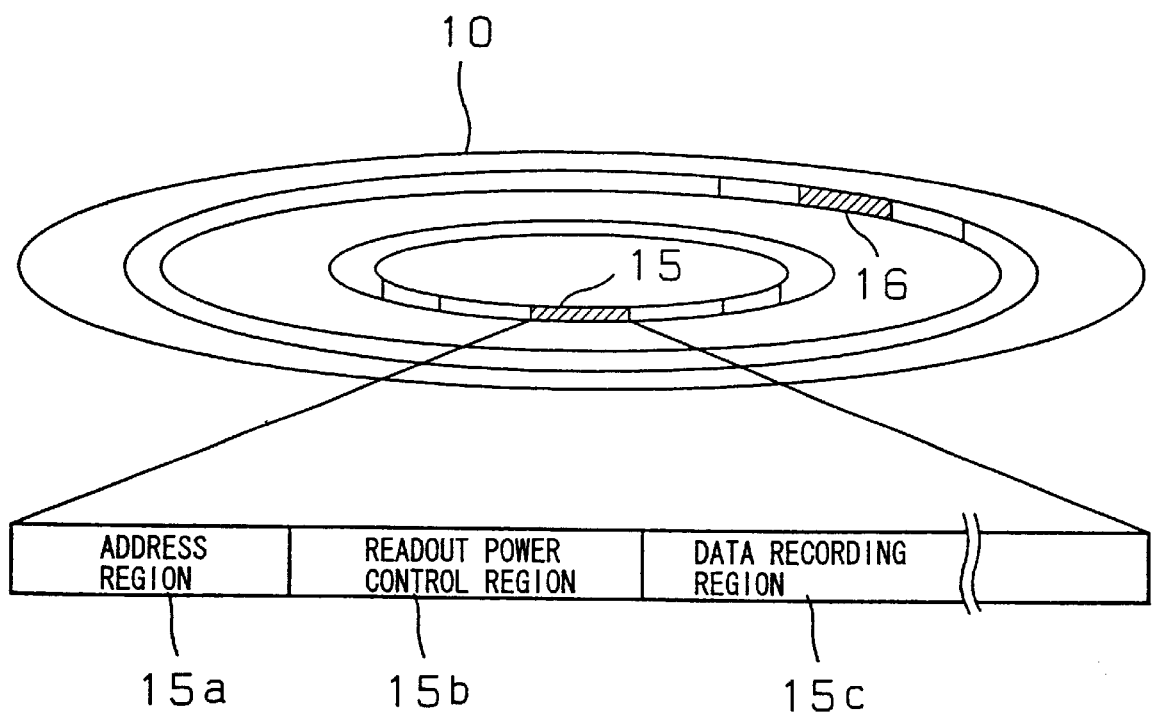
FIG. 12 is a drawing showing the structure of a magneto-optical disk representing an optical recording medium.
Figure 13:
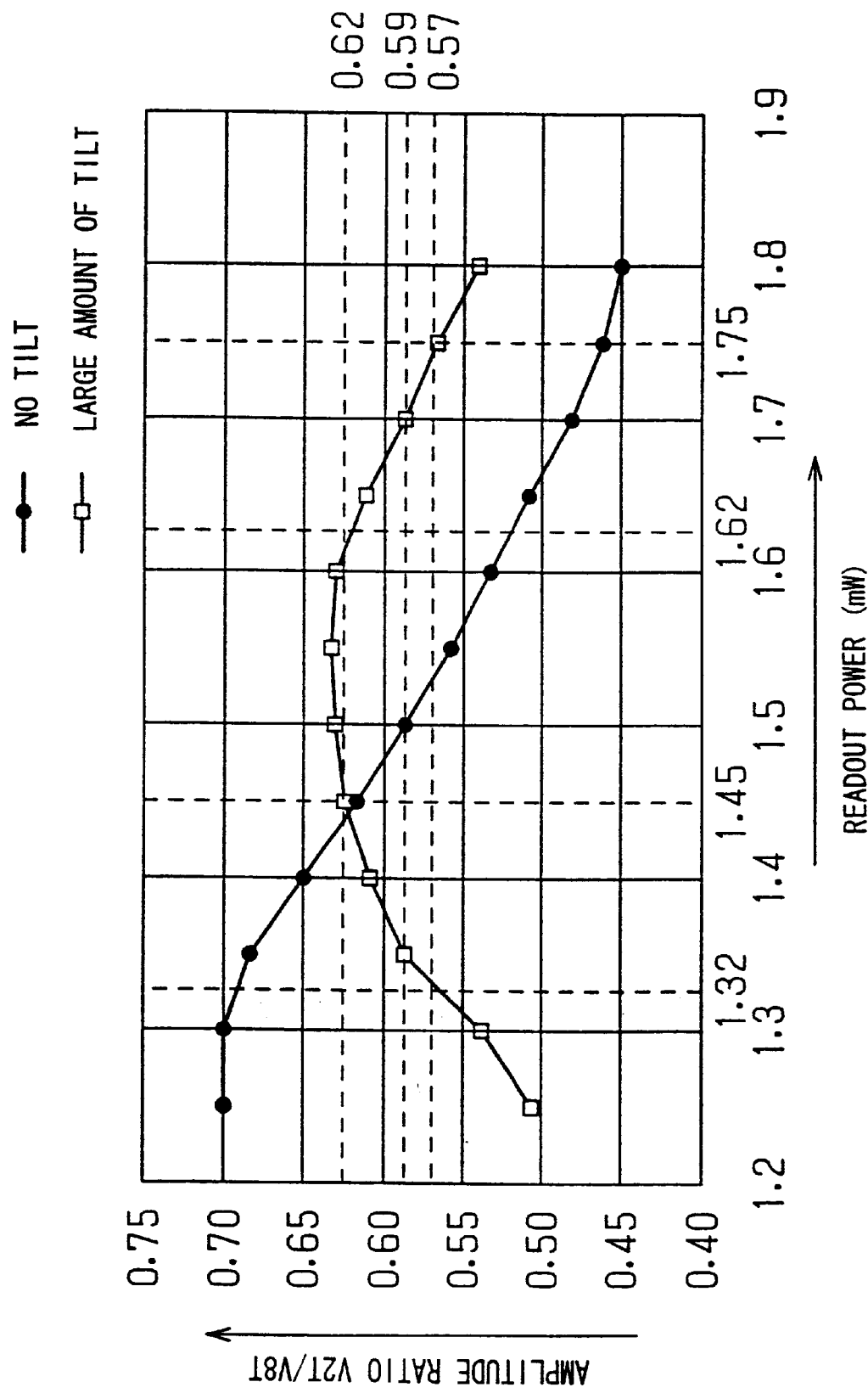
FIG. 13 is a graph showing results of actual measurements indicating the relationship of optimum amplitude ratio V2T/V8T with respect to readout power when there is practically no tilt and when there is a large amount of tilt.

FIG. 10 is a flowchart showing a sequence of switching operations associated with a switch 26 at the optical recording medium readout apparatus 21C. At step u1, the sequence of operations begins with determination by the seek status detection circuit 28 of whether or not the optical head 22 has initiated a seek operation. At step u1, if the seek status detection circuit 28 determines that the optical head 22 has initiated a seek operation then processing proceeds to step u2, but if the seek status detection circuit 28 determines that the optical head 22 has not initiated a seek operation then processing returns to step u1. The state of switch 26 prior to initiation of a seek operation by the optical head 22 is such that the readout power control circuit 25 is connected to the semiconductor laser source 22a, at which time a drive current is delivered to the semiconductor laser source 22a such as will cause production of an optimum readout power of value as indicated by the signal output from the readout power control circuit 25.

At step u2, upon receipt by the switch 26 of a seek status signal from the seek status detection circuit 28 indicating that the optical head 22 has initiated a seek operation, the switch 26 goes from a condition such that the readout power control circuit 25 is connected to the semiconductor laser source 22a to a condition such that the readout power value storage circuit 27 is connected to the semiconductor laser source 22a, at which time readout power control operations are temporarily suspended and a drive current is delivered to the semiconductor laser source 22a such as will cause production of a readout power of value as indicated by the signal output from the readout power value storage circuit 27, which value is the value stored at the readout power value storage circuit 27 and is the value of the readout power at the start of the seek operation, and processing proceeds to step u3.

At step u3, the seek status detection circuit 28 determines whether or not the optical head 22 has completed the seek operation. At step u3, if the seek status detection circuit 28 determines that the optical head 22 has completed the seek operation then processing proceeds to step u4, but if the seek status detection circuit 28 determines that the optical head 22 has not completed the seek operation then processing returns to step u3.

At step u4, upon receipt by the switch 26 of a seek status signal from the seek status detection circuit 28 indicating that the optical head 22 has completed the seek operation, the switch 26 goes from a condition such that the readout power value storage circuit 27 is connected to the semiconductor laser source 22a to a condition such that the maximum power value storage circuit 35 is connected to the semiconductor laser source 22a, at which time a drive current is delivered to the semiconductor laser source 22a such as will cause production of a readout power of value as indicated by the signal from the maximum power value storage circuit 35, which value is the maximum allowable readout power value stored at the maximum power value storage circuit 35, and processing proceeds to step u5.

At step u5, readout power control operations resume, with the deviation between the target amplitude ratio and the average amplitude ratio from the recorded marks for control of readout power in the readout power control region at the sector at which the optical head 22 first arrives following completion of the seek operation being determined by the differential amplifier 24, the readout power control circuit 25 calculating an optimum readout power for the sector based on the deviation and outputting a drive current such as will produce that optimum readout power, and processing proceeds to step u6.

At step u6, upon output by the readout power control circuit 25 of a drive current such as will produce the optimum readout power, the switch 26 goes from a condition such that the maximum power value storage circuit 35 is connected to the semiconductor laser source 22a to a condition such that the readout power control circuit 25 is connected to the semiconductor laser source 22a, at which time a drive current is delivered to the semiconductor laser source 22a such as will cause production of an optimum readout power of value as indicated by the signal output from the readout power control circuit 25, and processing returns to step u1. Readout power control operations are in all other respects similar to the readout power control operations of the optical recording medium readout apparatus 21 in the first embodiment.

By causing the readout power value at a time when readout power control operations resume to be on the order of a maximum allowable power value for the magneto-optical disk 81, the optical recording medium readout apparatus 21C of the present embodiment makes it is possible to definitively avoid abnormal power domains in which change in amplitude ratio with respect to change in readout power is not monotonically decreasing, instead entering or remaining in a normal readout power domain in which change in amplitude ratio with respect to change in readout power is monotonically decreasing, making it possible to reduce to an extremely low level the possibility of divergent readout power control operations and other such abnormal conditions, making it possible to avoid accidental erasure or disruption of information recorded on the magneto-optical disk 81, and making it possible to carry out readout power control with extremely high reliability. Furthermore, because the maximum power value read circuit 34 can read a maximum allowable power value which has been prerecorded on the magneto-optical disk 81, it is possible to carry out readout power control such that different maximum power values for magneto-optical disks are used to carry out optimum readout power control differently for different magneto-optical disks.

Whereas the above-described embodiments of the invention employ 2T marks as short marks and 8T marks as long marks for the recorded marks for control of the readout power of the semiconductor laser source 22a, the invention is not limited thereto, it being possible to obtain similar effect so long as readout power control operations are carried out using short and long marks capable of producing any suitable amplitude ratio.

Whereas it has been assumed in the optical recording medium readout apparatuses 21 and 21A through 21C in the above-described embodiments of the invention that, constant linear velocity (CLV) operation being the case, there is no change in linear velocity before and after the seek operation which is performed by the optical head 22, the invention may also be applied where the optical recording medium readout apparatuses 21 and 21A through 21C utilize constant angular velocity (CAV) operation, in which case effect similar to that obtained with the above-described embodiments of the invention may be obtained if readout power values before and after performing the seek operation are corrected based on the linear velocity at the applicable radial positions, and the readout power value is set so as to be greater than a value obtained by addition of a predetermined offset value which is not less than 0 to, and/or by multiplication of a predetermined factor which is not less than 1 by, the readout power values so corrected.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical recording medium readout apparatus comprising:

means for carrying out readout of information recorded on the optical recording medium by a light beam and for outputting a readout signal corresponding to readout information: and readout power control means for controlling a readout power of a light beam so as to reach a target value therefor based on an amplitude ratio obtained from readout signals produced by reading a plurality of types of marks on an optical recording medium, wherein the readout power control means sets readout power at a time when readout power control operations are next resumed following a temporary suspension thereof, so as to be greater than a readout power value at a point where change in amplitude ratio with respect to change in readout power goes from monotonically increasing to monotonically decreasing or from monotonically decreasing to monotonically increasing.

2. The optical recording medium readout apparatus of claim 1, wherein the readout power control means includes readout power value storage means for storing a value of a readout power at a time when readout power control operations are temporarily suspended, and the readout power control means employs as readout power value at a time when readout power control operations resume, a total value of a readout power value stored in the readout power value storage means and a predetermined value $\alpha$ which is not less than 0, or a value obtained by multiplying the readout power value stored in the readout power value storage means by a predetermined value $\beta$ which is not less than 1.

3. The optical recording medium readout apparatus of claim 1, wherein the readout power control means includes readout power value storage means for storing a value of a readout power at a time when readout power control operations are temporarily suspended, and temperature detection means for detecting an ambient temperature, and the readout power control means employs as readout power value at a time when readout power control operations resume, a total value of a corrected power value which is obtained by correcting a readout power value stored in the readout power value storage means based on a temperature detected by the temperature detection means and a predetermined value $\alpha$ which is not less than 0, or a value obtained by multiplying the corrected power value by a predetermined value $\beta$ which is not less than 1.

4. The optical recording medium readout apparatus of claim 2, wherein the predetermined value $\alpha$ is not less than 0.2 mW, and the predetermined value $\beta$ is not less than 1.2.

5. The optical recording medium readout apparatus of claim 3, wherein the predetermined value $\alpha$ is not less than 0.2 mW, and the predetermined value $\beta$ is not less than 1.2.

6. The optical recording medium readout apparatus of claim 1, wherein the readout power control means employs as readout power value at a time when power control operations resume, a value which is on the order of a maximum allowable power value for an optical medium.

7. The optical recording medium readout apparatus of claim 6, wherein maximum power value read means for reading a maximum allowable power value for an optical recording medium which has been prerecorded on the optical recording medium is provided, and the readout power control means employs as maximum allowable power value a maximum power value read by the maximum power value read means.

* * * * *

UNITED STATES PATENT AND TRADEMARK OFFICE
CERTIFICATE OF CORRECTION

PATENT NO.    : 6,674,701 B2
DATED         : January 6, 2004
INVENTOR(S)   : Tetsuya Okumura and Shigemi Maeda It is certified that error appears in the above-identified patent and that said Letters Patent is hereby corrected as shown below:

Title page,
Item [65], Prior Publication Data, US 2002/0089908 A1 Jul 11, 2002; please insert the following text:

-- [30]      Foreign Application Priority Data

Dec. 27, 2000       (JP) . . . . . . . . . . . . . . . . . . 2000-397235 --

Signed and Sealed this

Fifth Day of October, 2004

JON W. DUDAS
*Director of the United States Patent and Trademark Office*